United States Patent
Castel et al.

(10) Patent No.: US 8,177,493 B2
(45) Date of Patent: May 15, 2012

(54) AIRTIGHT EXTERNAL SHROUD FOR A TURBOMACHINE TURBINE WHEEL

(75) Inventors: Andre Castel, Lisses (FR); Bertrand Jean Joseph Marie Heurtel, Vert St Denis (FR); Sebastien Alain Imbourg, Yerres (FR); Florence Irene Noelle Leutard, Samoreau (FR); Guy Vieillefond, Morsang sur Orge (FR)

(73) Assignee: SNECMA, Paris (FR)

( * ) Notice: Subject to any disclaimer, the term of this patent is extended or adjusted under 35 U.S.C. 154(b) by 1092 days.

(21) Appl. No.: 12/051,261

(22) Filed: Mar. 19, 2008

(65) Prior Publication Data

US 2008/0240915 A1    Oct. 2, 2008

(30) Foreign Application Priority Data

Mar. 30, 2007 (FR) ...................... 07 02331

(51) Int. Cl.
  *F01D 5/20* (2006.01)
  *F01D 11/12* (2006.01)
(52) U.S. Cl. .................. 415/173.4; 415/174.4
(58) Field of Classification Search .............. 415/170.1, 415/173.1, 173.4, 173.5, 173.6, 174.4, 174.5
See application file for complete search history.

(56) References Cited

U.S. PATENT DOCUMENTS

| 3,367,629 | A | * | 2/1968 | Partington | .................... 416/190 |
| 3,970,318 | A | * | 7/1976 | Tuley | ............................ 277/641 |
| 4,053,254 | A | * | 10/1977 | Chaplin et al. | ................ 415/116 |
| 4,482,296 | A | * | 11/1984 | Wassell et al. | ............... 416/215 |
| 6,340,286 | B1 | * | 1/2002 | Aksit et al. | ................. 415/173.3 |
| 6,439,844 | B1 | * | 8/2002 | Turnquist et al. | .......... 415/173.3 |
| 7,186,078 | B2 | * | 3/2007 | Tanaka | ....................... 415/170.1 |
| 7,510,370 | B2 | * | 3/2009 | Strangman et al. | ........ 415/173.4 |

FOREIGN PATENT DOCUMENTS

| EP | 1 207 272 A2 | 5/2002 |
| GB | 1 324 385 | 7/1973 |
| GB | 2 410 530 A | 8/2005 |

* cited by examiner

*Primary Examiner* — Edward Look
*Assistant Examiner* — Jason Davis
(74) *Attorney, Agent, or Firm* — Oblon, Spivak, McClelland, Maier & Neustadt, L.L.P.

(57) ABSTRACT

External shroud for a turbomachine turbine wheel, this shroud being formed of ring sectors (120) positioned circumferentially end to end, and each comprising a circumferentially directed plate (136) bearing a block (138) of abradable material, the plate and the block of each ring sector being offset one with respect to the other in the circumferential direction so that a circumferential end part of the plate of each ring sector overlaps a corresponding end part of the block of an adjacent ring sector.

7 Claims, 2 Drawing Sheets

_US 8,177,493 B2_

AIRTIGHT EXTERNAL SHROUD FOR A TURBOMACHINE TURBINE WHEEL

BACKGROUND OF THE INVENTION

The present invention relates to an airtight external shroud for a turbine wheel of a turbomachine such as an airplane turbojet or turboprop engine.

A turbomachine turbine comprises several stages each involving a nozzle assembly formed of an annular row of stationary vanes borne by a casing of the turbine, and a wheel mounted such that it can rotate downstream of the nozzle assembly in a cylindrical or frustoconical shroud formed by ring sectors which are positioned circumferentially end to end and are attached to the casing of the turbine.

Each ring sector comprises a circumferentially directed plate which bears a block of abradable material fixed to the internal surface of the plate. This block is, for example, of the honeycomb type and is intended to become worn by rubbing against the external periphery of the wheel in order to minimize the radial clearances between the wheel and the ring sectors.

DESCRIPTION OF THE PRIOR ART

In the prior art, sealing between the ring sectors is afforded by means of sealing strips attached and fixed between the ring sectors. Each strip is engaged at one of its ends in a first groove formed on a longitudinal edge of a plate of a ring sector and at the other of its ends in a second groove formed on a longitudinal edge of the plate of an adjacent ring sector, these first and second grooves facing one another.

However, these strips do not afford a perfect seal between the ring sectors because they extend over only part of the axial dimension of the ring sectors. Leaks of hot gases from the turbine duct result in a reduction in turbine performance and may cause the turbine casing temperature to rise, causing this casing to crack or become fissured.

Furthermore, the plate has to be thick enough, particularly at its longitudinal edges, that the grooves that house the sealing strips can be machined therein, this leading to an increase in the mass of the ring sectors and of the turbomachine, something which is always detrimental in aeronautical engineering.

In addition, the method of machining the grooves on the plates of the ring sectors is expensive and complicated to implement and may cause damage to the ring sectors. Finally, the sealing strips are expensive and it takes a relatively long length of time to mount them in the grooves of the ring sectors.

SUMMARY OF THE INVENTION

It is a particular object of the invention to provide a simple, effective and economical solution to these problems.

To this end, the invention proposes an external shroud for a turbomachine turbine wheel, this shroud being substantially cylindrical and formed of ring sectors positioned circumferentially end to end, each ring sector comprising a circumferentially directed plate bearing a block of abradable material fixed to the internal surface of the plate, wherein the circumferential dimension of the plate of each ring sector is substantially identical to that of the block of abradable material borne by this plate, and wherein the plate and the block of each ring sector are offset one with respect to the other in the circumferential direction so that a circumferential end part of the plate of each ring sector overlaps a corresponding end part of the block of an adjacent ring sector, this being so over the entire axial dimension of the ring sector.

According to the invention, the plate and the block of abradable material of each ring sector are not radially aligned with one another but are instead circumferentially offset one with respect to the other. This circumferential offset results in a mutual overlap of two adjacent ring sectors thus providing a good seal between the ring sectors, this being so over their entire axial dimension. The ring sectors alone seal the external shroud airtight and there is therefore no longer any need to add additional components such as strips to the shroud in order to make it airtight. The circumferential end part of the plate of a first ring sector is separated by a small circumferential clearance from the plate of an adjacent second ring sector and overlaps a block of abradable material of this second ring sector, being separated from this block by a small radial clearance. These clearances are determined such as to allow thermal expansion of the ring sectors in the radial and circumferential directions when the turbine is running.

The plate and the block of each ring sector may be circumferentially offset one with respect to the other by an angle $\alpha$ smaller than about 2°, measured about the longitudinal axis of the turbine. The aforementioned end part of the plate of each ring sector may overlap the corresponding end part of the block of an adjacent ring sector over a circumferential distance smaller than about 10 mm.

According to another feature of the invention, the block of abradable material of each ring sector is borne by a circumferentially directed sheet which is fixed, for example, by brazing, to the internal surface of the plate of the ring sector. The block of abradable material is fixed beforehand to the sheet which is itself fixed, for example by brazing, to the internal face of the plate of the ring sector. This ensures that the block of abradable material will be correctly positioned on the plate, and makes it easier to replace the block should it suffer significant wear. The sheet for example has a thickness or radial dimension smaller than about 1 mm.

The invention also relates to a turbomachine turbine comprising rotor wheels, wherein at least one of these wheels is surrounded by an external shroud as described hereinabove. The invention finally relates to a turbomachine, such as an airplane turbojet or turboprop engine, and which comprises a turbine of this type.

BRIEF DESCRIPTION OF THE DRAWINGS

The invention will be better understood and further features, details and advantages thereof will become more clearly apparent from reading the description which follows, which is given by way of nonlimiting example, and with reference to the attached drawings in which.

DESCRIPTION OF THE PREFERRED EMBODIMENT

Figure 1:
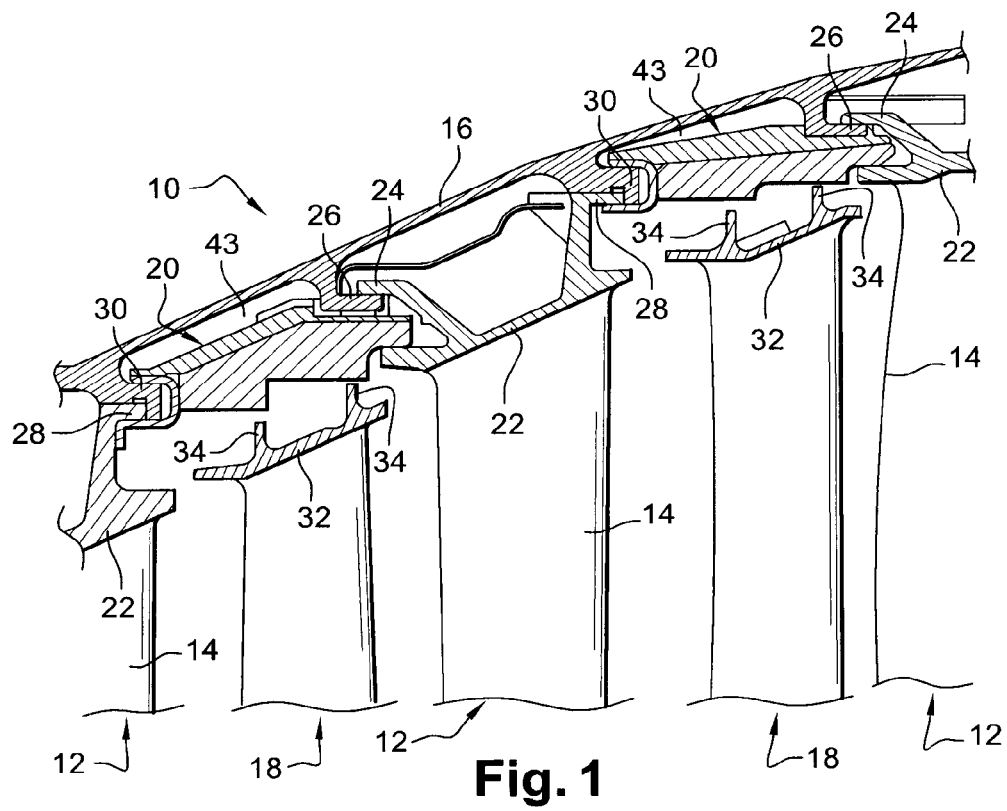
FIG. 1 is a schematic part view in axial section of a turbomachine turbine.

The turbine 10 partially depicted in FIG. 1 comprises several stages each involving a nozzle assembly 12 formed of an annular row of stationary vanes 14 borne by a casing 16 of the turbine, and a wheel 18 mounted downstream of the nozzle assembly 12 and rotating in a substantially cylindrical shroud formed by ring sectors 20 positioned circumferentially end to end and borne by the casing 16 of the turbine.

Each nozzle assembly 12 comprises external 22 and internal (not visible) walls that exhibit symmetry of revolution and that between them delimit the annular duct through which the gases flow through the turbine and between which the vanes 14 extend radially. The external wall of the nozzle assembly at its upstream end comprises an external cylindrical rim 24 directed upstream and mounted on an annular rail 26 of the casing and at its downstream end comprises an external cylindrical rim 28 directed downstream and held radially against an annular rail 30 of the casing.

The wheels 18 are borne by a turbine shaft (not depicted). They each comprise external 32 and internal (not visible) shell rings, the external shell ring 32 of each wheel comprising external annular ribs 34 externally surrounded with a small radial clearance by the ring sectors 20. Each ring sector 20 better visible in FIG. 2 comprises a circumferentially directed wall 36 and a block 38 of abradable material fixed, for example by brazing, to the radially internal surface of the wall 36, this block 38 being of the honeycomb type and being intended to be worn away by rubbing against the ribs 34 of the wheel 18 in order to minimize the radial clearances between the wheel and the ring sectors 20.

The downstream ends of the ring sectors 20 are housed in an annular space delimited by the upstream end of the external wall 22 of the nozzle assembly 12 situated downstream of the ring sectors, on the one hand, and by the rail 26 of the casing to which the upstream rim 24 of this nozzle assembly is attached, on the other. The walls 36 of the ring sectors also define, at their downstream ends, an annular channel 42 opening radially to the outside and in which the casing rail 26 is mounted as a close fit.

Each ring sector 20 also comprises at its upstream end a circumferentially directed attachment member 40 of C-shaped cross section, the open side of which is directed upstream. This member 40 is fixed for example by brazing to the internal surface of the ring sector 20 upstream of the block of abradable material 38 and is engaged from the downstream end over the downstream cylindrical rim 28 of the nozzle assembly 12 situated upstream of the ring sectors and over the casing rail 30 on which this cylindrical rim 28 is mounted so as to keep the rim 28 and the casing rail 30 clamped radially against one another.

It is important to ensure a perfect seal between the ring sectors 20 so as to prevent leaks of hot gases flowing through the turbine, radially from the inside outward, into the annular space 43 delimited by the ring sectors 20 and the casing 16 of the turbine. This is because such gas leaks actually reduce the performance of the turbine and of the turbomachine and can cause the temperature of the casing 16 to rise and lead to cracking or fissuring of the casing rails 26, 30, potentially destroying them.

In the prior art, sealing between the ring sectors 20 has been achieved using sealing strips (not depicted) fitted into grooves 46 formed on the longitudinal edges 44 of the plate of each ring sector. Each strip extends between two adjacent ring sectors. One of the ends of the strip is engaged in a rectilinear groove 46 formed on a longitudinal edge 44 of the plate of a first ring sector and the other of its ends is engaged in a corresponding groove formed on a longitudinal edge of the plate of another, second, ring sector, these grooves 46 facing one another.

Figure 2:
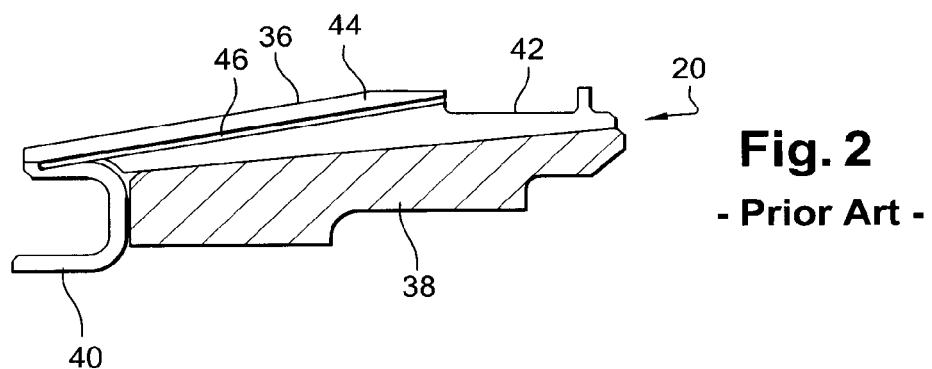
FIG. 2 is a schematic view of a ring sector of an external shroud according to the prior art, in side view.

In the example depicted in FIG. 2, this groove 46 extends over just part of the axial dimension of the ring sector 20. The sealing strips therefore do not provide sealing over the entire axial dimension of the ring sectors. What is more, the plate 36 needs to be thick enough that the grooves 46 can be machined therein, this appreciably increasing the total mass of the external shroud. Finally, the strips are expensive to produce and take a relatively long time to fit between the ring sectors 20.

Figure 3:
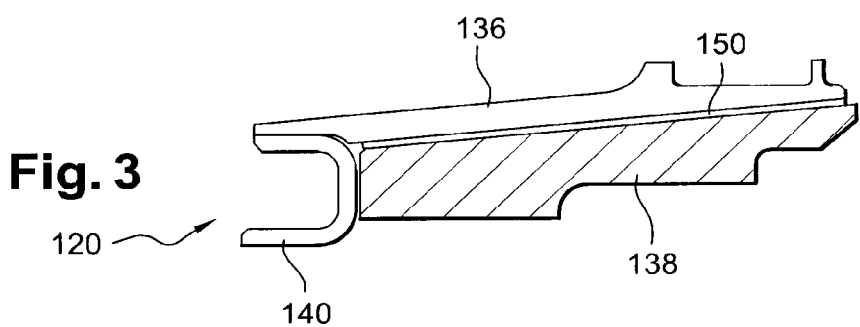
FIG. 3 is a schematic view of a ring sector of an external shroud according to the invention, in side view.
Figure 4:
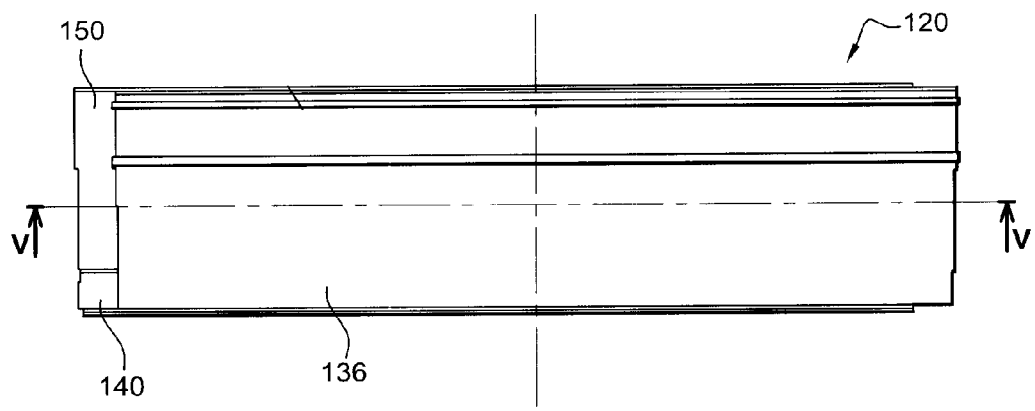
FIG. 4 is another schematic view of the ring sector according to the invention, in plan view.
Figure 5:
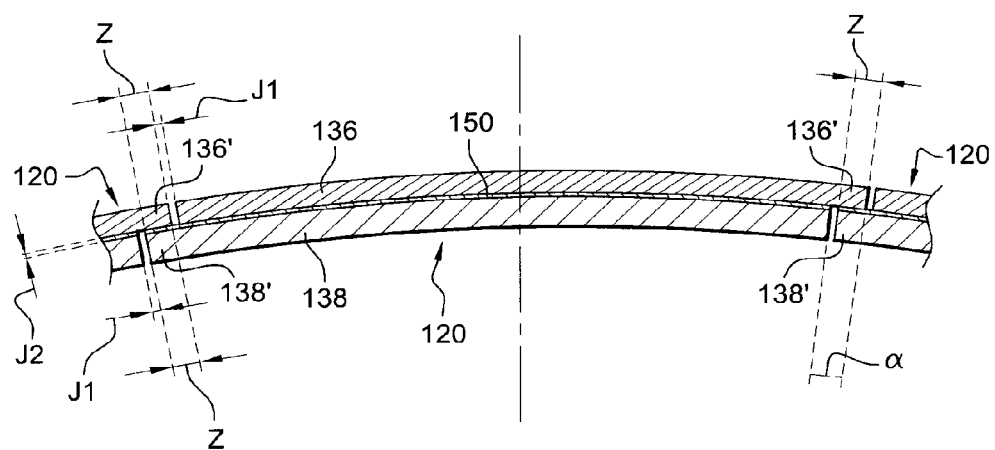
FIG. 5 is a view in section on V-V of FIG. 4.

The invention makes it possible to solve all of these problems by offsetting the plate and the block of abradable material of each ring sector in the circumferential direction, the sealing between two adjacent ring sectors actually resulting from a chicane effect brought about by the mutual overlapping of these ring sectors (FIGS. 3 to 5).

As in the prior art, each ring sector 120 comprises a circumferentially directed wall 136, a block of abradable material 138 and a C-section attachment member 140.

The wall 136 of the ring sector according to the invention differs from the prior art in that its thickness or radial dimension is much smaller because there is no need to provide an extra thickness of material at the longitudinal edges of the plate in order to be able to machine the grooves therein.

By way of example, for an external shroud measuring about 1 meter in diameter and made up of 20 ring sectors, the reduction in the thickness of the plates 136 of the ring sectors 120 according to the invention allows the total mass of this shroud to be reduced by about 500 grams.

The attachment member 140 is substantially identical to the one in FIG. 2.

The block of abradable material 138 is borne by a circumferentially directed sheet 150 which is fixed by brazing to the internal surface of the plate 136 of the ring sector. The sheet has a radius of curvature substantially identical to that of the plate, and a relatively small thickness for example less than about 1 mm. The block of abradable material 138, the sheet 150 and the plate 136 of each ring sector has substantially the same circumferential dimension, and the sheet and the block also have axial dimensions very similar to one another.

The ring sectors 120 are separated from one another by a small circumferential clearance J1 which allows thermal expansions of the ring sectors in the circumferential direction when the turbine is running.

The plate 136 of each ring sector 120 is circumferentially offset from the block of abradable material 138 of this ring sector by an angle α, measured about the longitudinal axis of the turbine, this angle being smaller than 2° and, for example, measuring about 1°. The free circumferential end part 136' of each plate overlaps the corresponding free end part 138' of the block of abradable material of an adjacent ring sector and is separated from this block by a small radial clearance J2 so as to allow radial thermal expansions of the ring sectors.

In one particular embodiment of the invention, the ring sectors form an external shroud about one meter in diameter and each have a circumferential dimension of about 15 cm. The area Z of mutual overlap of two adjacent ring sectors 120 has a circumferential dimension smaller than about 10 mm, and an axial dimension substantially equal to that of the ring sectors, which is of the order of about 4 cm.

The invention claimed is:

1. An external shroud for a turbomachine turbine wheel, the shroud being substantially cylindrical, the shroud comprising:
   ring sectors positioned circumferentially end to end, each ring sector including
   a circumferentially directed plate,
   a circumferentially directed sheet brazed to an internal surface of the plate, and
   a block of abradable material fixed to the sheet, wherein a circumferential dimension of the plate of each ring sector is substantially identical to a circumferential dimension of the block of abradable material, and wherein, over an entire axial dimension of the ring sector, the sheet and the block of each ring sector are offset with respect to the plate of the ring sector in a circumferential direction so that a circumferential end part of the plate of each ring sector overlaps a corresponding end part of the sheet and the block of an adjacent ring sector.

2. The external shroud as claimed in claim 1, wherein the plate and the block of each ring sector are circumferentially offset from each other by an angle α smaller than about 2°.

3. The external shroud as claimed in claim 1, wherein the circumferential end part of the plate of each ring sector overlaps the corresponding end part of the block of an adjacent ring sector over a circumferential distance smaller than about 10 mm.

4. The external shroud as claimed in claim 1, wherein the circumferential end part of the plate of each ring sector is separated by a small radial clearance from the corresponding end part of the block of an adjacent ring sector.

5. The external shroud as claimed in claim 1, wherein the sheet has a thickness or radial dimension smaller than about 1 mm.

6. A turbomachine turbine comprising:

rotor wheels, wherein at least one of these rotor wheels is surrounded by an external shroud as claimed in claim 1.

7. A turbomachine comprising: a turbine as claimed in claim 6.

* * * * *